United States Patent
Franck et al.

(10) Patent No.: US 9,114,738 B2
(45) Date of Patent: Aug. 25, 2015

(54) FLIP FORWARD BUCKLE ASSEMBLY

(75) Inventors: Chris Franck, Fort Mill, SC (US); Lynn Curtis Strong, Rock Hill, SC (US); Mark Allen Gunter, York, SC (US)

(73) Assignee: BRITAX CHILD SAFETY INC., Fort Mill, SC (US)

( * ) Notice: Subject to any disclaimer, the term of this patent is extended or adjusted under 35 U.S.C. 154(b) by 369 days.

(21) Appl. No.: 13/467,710

(22) Filed: May 9, 2012

(65) Prior Publication Data

US 2013/0300168 A1    Nov. 14, 2013

(51) Int. Cl.
*B60N 2/26* (2006.01)
*B60R 22/10* (2006.01)
*B60N 2/28* (2006.01)

(52) U.S. Cl.
CPC .................................. *B60N 2/2806* (2013.01)

(58) Field of Classification Search
USPC ............................................... 297/467, 250.1
See application file for complete search history.

(56) References Cited

U.S. PATENT DOCUMENTS

| | | | | |
|---|---|---|---|---|
| 5,061,012 A | * | 10/1991 | Parker et al. | 297/467 |
| 5,429,419 A | * | 7/1995 | Kassai et al. | 297/467 |
| 5,709,408 A | | 1/1998 | Carraway, Jr. | |
| 5,979,983 A | | 11/1999 | Galbreath | |
| 6,543,847 B2 | | 4/2003 | Balensiefer | |
| 6,659,564 B2 | * | 12/2003 | Kassai et al. | 297/484 |
| 6,893,088 B2 | * | 5/2005 | Kassai et al. | 297/250.1 |
| 7,350,862 B2 | * | 4/2008 | Fransen et al. | 297/250.1 |
| 7,445,286 B2 | | 11/2008 | Siewertsen et al. | |
| 7,458,636 B2 | | 12/2008 | Chen et al. | |
| 7,585,026 B2 | | 9/2009 | Kassai et al. | |
| 7,648,208 B2 | | 1/2010 | Weinstein et al. | |
| 7,648,209 B2 | | 1/2010 | Weinstein et al. | |
| 7,735,919 B2 | | 6/2010 | Chen et al. | |
| 7,862,125 B2 | | 1/2011 | Weinstein et al. | |
| 8,001,634 B2 | | 8/2011 | Ayette et al. | |
| 8,038,214 B2 | * | 10/2011 | Brandl et al. | 297/250.1 |
| 8,419,127 B1 | * | 4/2013 | Wilhelm et al. | 297/216.13 |
| 2005/0179289 A1 | | 8/2005 | Fuller et al. | |
| 2011/0006572 A1 | * | 1/2011 | Zhao | 297/256.15 |

FOREIGN PATENT DOCUMENTS

CN     101954897 A     1/2011

* cited by examiner

*Primary Examiner* — David R Dunn
*Assistant Examiner* — Tania Abraham
(74) *Attorney, Agent, or Firm* — Nelson Mullins Riley & Scarborough LLP

(57) ABSTRACT

A harness assembly for a child safety seat is provided that is configurable between an engaged state and a disengaged state. The harness assembly may include a plurality of shoulder straps, each having a buckle tab. The harness assembly may further include a buckle assembly having a buckle that can receive the buckle tabs for securing the shoulder straps in the engaged state. The buckle assembly may also include a buckle pad, at least a portion of the buckle pad being generally aligned with and adjacent to the buckle. A buckle webbing may extend from the buckle for attaching the buckle to the child safety seat, and a biasing member may be engaged with the buckle pad to bias the buckle assembly toward a first position away from an occupant of the child safety seat in the disengaged state. A corresponding child safety seat is also provided.

17 Claims, 6 Drawing Sheets

FLIP FORWARD BUCKLE ASSEMBLY

TECHNICAL FIELD

The present invention generally relates to the field of child safety seats, and more particularly, to a child safety seat including a harness assembly configured to restrain an infant and/or child in the child safety seat and to a method of securing a child to the child safety seat.

BACKGROUND

Child safety seating products are designed to protect children in vehicles from the effects of impacts or other sudden changes in motions. Child safety seats, commonly referred to simply as car seats, may be used in a variety of vehicles with a variety of seating configurations. It is important for a child safety seat to securely retain an occupant and limit movement of that occupant, particularly during an impact. Typically, a child safety seat will include a harness assembly configured to secure the child to the child safety seat when a child occupies the child safety seat.

Some harness assemblies of child safety seats include a plurality of shoulder straps that are configured to engage a buckle that is attached to a seat portion of the child safety seat and extends between the child's legs. Some harness assemblies are difficult to position to allow for a child to initially occupy the seat. Often, the harness assembly must be manually arranged by a user to facilitate the initial placement of a child in the child safety seat. In addition, children and infants are often unwilling to be placed in a child safety seat, making the manipulation of the harness assembly and the placement of the child into the seat even more difficult. Accordingly, it would be desirable to produce a buckle assembly that provides for easier insertion and/or removal of a child from a child safety seat.

BRIEF SUMMARY

Various embodiments of the present invention are directed to child safety seats that may reduce the likelihood of injury to an occupant of the seat resulting from an impact. In particular, embodiments of the present invention are directed to a harness assembly configured to restrain a child occupying the child safety seat.

According to one embodiment, a harness assembly is provided that is configurable between an engaged state and a disengaged state for a child safety seat. The harness assembly comprises a plurality of shoulder straps, each shoulder strap including a buckle tab, and at least one buckle assembly. The buckle assembly comprises a buckle configured to receive the buckle tabs for securing the shoulder straps in the engaged state, a buckle pad, where at least a portion of the buckle pad is generally aligned with and adjacent to the buckle, a buckle webbing extending from the buckle and configured to attach the buckle to the child safety seat, and a biasing member engaged with the buckle pad. The biasing member is configured to bias the buckle assembly toward a first position away from an occupant of the child safety seat in the disengaged state.

The biasing member may comprise a closed loop of material, and in some cases the biasing member may comprise a metal material and/or a braided material. The buckle pad may include a buckle pad tail portion configured to receive at least a portion of the biasing member and a buckle pad head portion generally aligned with the buckle. The buckle pad may be disposed between an occupant and the buckle, and the buckle pad may be configured to provide the occupant with cushioning from the buckle. In some cases, the buckle pad may further comprise a biasing member pocket that is configured to receive the biasing member therein. The biasing member pocket may extend from one end located in the buckle pad tail portion to another end located in the buckle pad head portion. Additionally or alternatively, the buckle pad may include a buckle strap configured to receive the buckle webbing therethrough such that when a biasing force is applied to the buckle pad by the biasing member, the biasing force is also applied to the buckle webbing. The buckle webbing may be configured to secure the buckle assembly to the child safety seat.

In some embodiments, the child safety seat may comprises a back portion and a seat portion, and the biasing member may be configured to move the buckle assembly to a position adjacent the seat portion and away from the back portion in the first position. The first position may be located forward of a second position, and the second position may be defined by the position of the buckle when the harness assembly is in the engaged state.

In other embodiments, a child safety seat is provided that is configurable to be attached to a vehicle seat. The child safety seat may comprise a seat portion configured to receive a child thereon, a back portion extending upwardly from an edge of the seat portion, a seat cover configured to cover the seat portion and the back portion, and a harness assembly configurable between an engaged state and a disengaged state. The harness assembly may include a plurality of shoulder straps, each shoulder strap including a buckle tab, and at least one buckle assembly. The buckle assembly may comprise a buckle configured to receive the buckle tabs for securing the shoulder straps in the engaged state, a buckle pad, at least a portion of which is generally aligned with and adjacent to the buckle, a buckle webbing extending from the buckle and configured to attach the buckle to the child safety seat, and a biasing member engaged with the buckle pad. The biasing member may be configured to bias the buckle assembly toward a first position away from the back portion of the child safety seat in the disengaged state.

The biasing member may comprise a closed loop of material. In some cases, the biasing member may comprise a braided metal material. The buckle pad may include a buckle pad tail portion configured to receive at least a portion of the biasing member and a buckle pad head portion generally aligned with the buckle. At least a portion of the buckle pad tail portion may be disposed between the seat portion and the seat cover. Furthermore, at least a portion of the buckle pad may be disposed between an occupant and the buckle. The buckle pad may be configured to provide the occupant with cushioning for the buckle in the engaged state. The buckle pad may further comprise a biasing member pocket configured to receive the biasing member therein, and the biasing member pocket may extend from one end located in the buckle pad tail portion to another end located in the buckle pad head portion. The buckle pad may include a buckle strap configured to receive the buckle webbing therethrough such that when a biasing force is applied to the buckle pad by the biasing member, the biasing force is also applied to the buckle webbing.

In some cases, the child safety seat may further comprise a buckle anchor that is coupled to an end of the buckle webbing opposite of the buckle. The buckle anchor may be configured to attach the buckle assembly to the seat portion. The biasing member may be configured to move the buckle assembly to a position adjacent the seat portion and away from the back portion in the first position. The first position may be located forward of a second position, and the second position may be defined by the position of the buckle when the harness assembly is in the engaged state.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
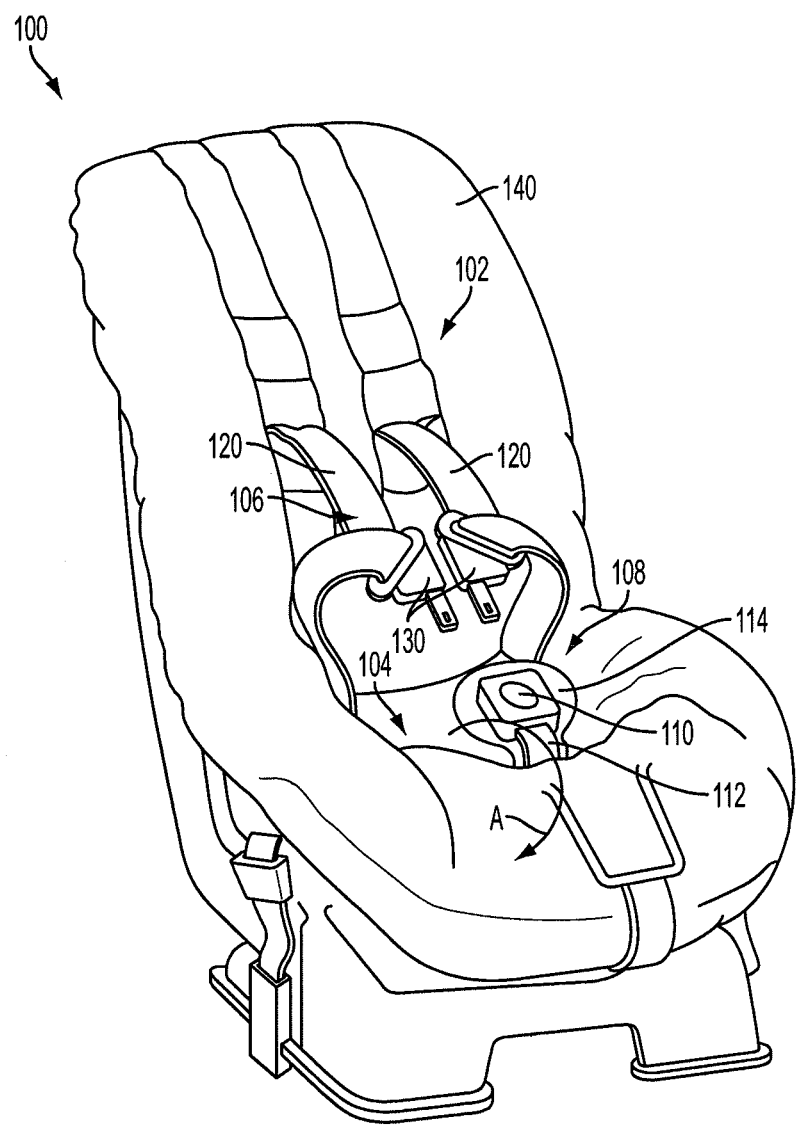
FIG. 1 illustrates a child safety seat according to one embodiment of the present invention.

The present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used herein do not imply a required limitation in all embodiments of the present invention, but rather are used herein to help describe relative direction or orientation in the example embodiments illustrated in the figures.

A child safety seat may be configured for installation in a forward-facing position or in a reward-facing position to accommodate children in the appropriate position based on the height and weight of a child, such as according to the guidelines and standards of the United States National Highway Transportation Safety Administration (NHTSA) and similar authorities in other countries.

In addition, child safety seats are usually securely attached to a fixed location within the vehicle, such as in accordance with the international standard for attachment points for child safety seats, ISOFIX, or using LATCH (Lower Anchors and Tethers for Children) attachments in the U.S. Proper installation and use of a child safety seat within a vehicle is necessary to achieve the maximum protection afforded by the seat. Accordingly, when a child is placed within the child safety seat, the child safety seat harness is typically secured via a buckle to keep the child in the child safety seat while the vehicle is in motion.

Some child safety seats may include a seat portion and a back portion. In addition, some child safety seats are positioned such that an edge of the seat portion of the child safety seat, which in some instances may include a buckle attached thereto, is angled upwards from a horizontal plane with respect to the opposite edge of the seat portion adjacent the back portion. Accordingly, when the buckle is not engaged with the harness, the buckle may be naturally biased (e.g., by gravity) inwardly towards the back portion of a child safety seat. As such, when placing a child in the child safety seat for use, the child may experience temporary discomfort when placed on top of the buckle. Moreover, a user may find it difficult to locate and/or access the buckle when the child is sitting on the buckle, and the user may need to remove the child from the child safety seat to locate the buckle or at least shift the child in the seat, which may be difficult and/or time consuming.

Various embodiments of the present invention provide a child safety seat configured for attachment to a seat in a variety of vehicles. Additionally, some embodiments provide a child safety seat including a harness assembly that is configurable between an engaged state and a disengaged state. In the engaged state, a child occupying the child safety seat will be restrained in a secured fashion to the child safety seat, as described in greater detail below.

According to some embodiments, the child safety seat 100 may include a back portion 102 and a seat portion 104, as illustrated in FIG. 1. According to some embodiments, the seat portion 104 may be configured to receive a child thereon. The seat portion 104 may include an edge (not visible) disposed adjacent and/or coupled to an edge of the back portion 102. In some embodiments, the back portion 102 may extend upwardly from the seat portion 104. For example, the back portion 102 may extend upwardly from the seat portion 104 in a substantially perpendicular manner with respect to a horizontal plane. According to some embodiments, the child safety seat 100 may include a seat cover 140 configured to cover the seat portion 104 and back portion 102 of the child safety seat. As such, a child may be placed in the child safety seat 100 such that the seat cover may be disposed between the child and the child safety seat 100. In particular, the child may be placed in the child safety seat 100 such that the child's upper body (e.g., the child's head, neck, and/or back) rests against the back portion 102 and the child's lower body (e.g., the child's posterior and legs) rests against the seat portion 104. Additionally, the seat cover 140 may provide a cushioned support for the child's upper body and the child's lower body as the child rests against the back portion 102 and the seat portion 104, respectively.

Additionally, the child safety seat 100 may include a harness assembly 106. In some embodiments, the harness assembly 106 may include shoulder straps 120. Additionally, the harness assembly 106 may include buckle tabs 130 configured to engage a buckle 110 so as to secure the shoulder straps 120 to the buckle 110 in an engaged state.

In some embodiments, the harness assembly 106 may further include at least one buckle assembly 108 comprising a buckle 110 configured to receive the buckle tabs 130 for securing the shoulder straps 120 in the engaged state. The buckle assembly 108 may further include a buckle pad 114, wherein at least a portion of the buckle pad 114 is generally aligned with and adjacent to the buckle 110, as shown in FIGS. 1 and 2C. For example, the buckle pad 114 may be adjacent to the buckle 110 such that the buckle pad 114 and the buckle 110 contact one another when the harness assembly is in the engaged state and a child occupies the child safety seat 100. In some embodiments, a buckle pad 114 may be configured to provide cushioning between the buckle 110 and a child occupying the child safety seat. For example, the buckle pad 114 may include cushioning material (e.g., foam, wadding, fabric, etc.) such that when the buckle assembly 108 and the harness assembly 106 are in the engaged state, a child occupying the seat experiences minimal discomfort from the buckle 110.

According to some embodiments, the buckle assembly 108 may include a buckle webbing 112 extending from the buckle 110 and configured to attach the buckle 110 to the child safety seat 100. For example, the buckle webbing 112 may be secured to the seat portion 104 of the child safety seat 100 via a buckle anchor 113 (shown in FIG. 2C). As such, the buckle webbing 112 may be configured to attach a buckle 110 to the child safety seat and may be configured to extend between a child's legs when the child occupies the child safety seat. In the depicted embodiment, the buckle webbing 112 comprises a single length of material that is anchored in one location (e.g., via the buckle anchor 113) to the seat portion 104. In other embodiments, however, the buckle webbing may comprise a plurality of straps, such as two straps that are connected to the buckle 110 and are anchored to the seat portion 104 of the child safety seat at two or more locations (e.g., via two or more anchors).

Figure 3:
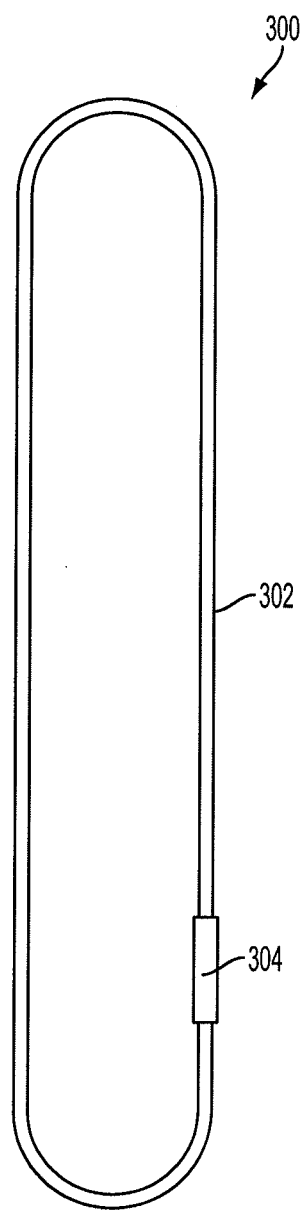
FIG. 3 illustrates a biasing member of a buckle assembly according to one embodiment of the present invention.

In some embodiments, the buckle assembly 108 may include a biasing member 300, shown in FIG. 3, engaged with the buckle pad 114 and configured to bias the buckle assembly 108, in an instance in which the harness assembly 106 is in the disengaged state, toward a first position located away from the back portion 102 of the child safety seat 100. For example, when the harness assembly 106 is in the disengaged state and a child is occupying the child safety seat, the buckle assembly 108 may be biased away from the child towards a location between the child's legs and proximate to the seat portion 104.

For example, the biasing member 300 may be configured to bias the buckle assembly 108 forwardly along the direction of curved arrow A, as shown in FIG. 2C, when the buckle assembly 108 is disengaged from the shoulder straps 120. In some embodiments, when the buckle assembly 108 is secured to the buckle tabs 130 of the shoulder straps 120 in the engaged state, the coupling of the shoulder straps 120 to the buckle assembly 108 overcomes a forwardly biasing force configured to bias the buckle assembly 108 to the first position along the direction A. Accordingly, in FIG. 1, the buckle assembly 108 is depicted in an instance in which the biasing force is overcome (e.g., by a user attempting to engage the buckle 110 with the buckle tabs 130). Although FIG. 1 illustrates a buckle assembly that is used with a child safety seat, one skilled in the art may appreciate that the buckle assembly may be used with any seat (such as a high chair, stroller, etc.) so as to bias a buckle away from a back portion of the seat and/or clear the way for an occupant to be placed into the seat as described herein to facilitate use of the buckle and/or entry and removal of an occupant to the seat.

Figure 2A:
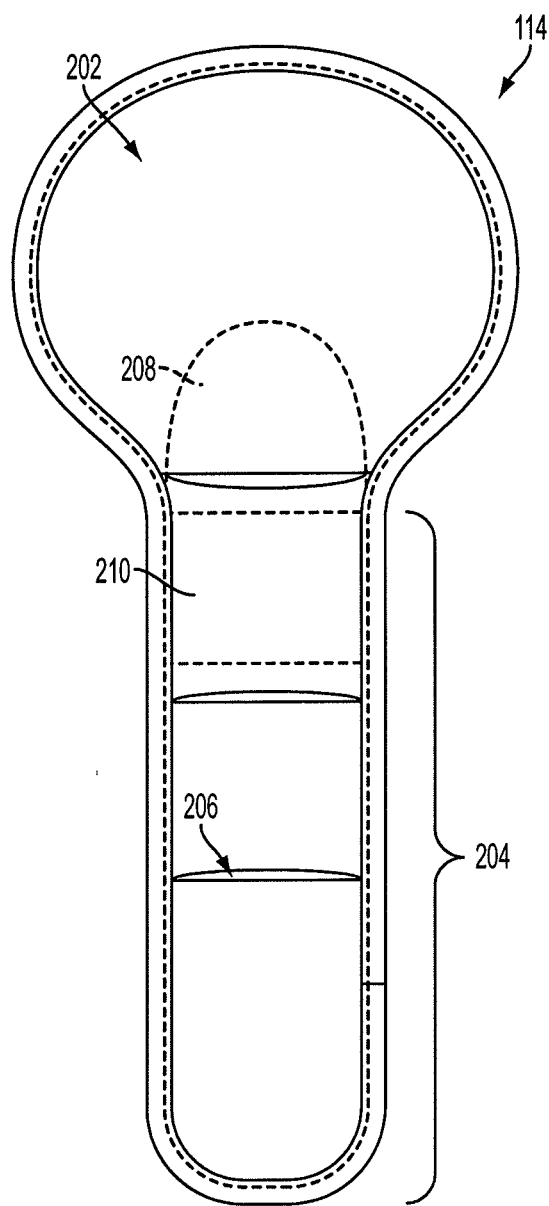
FIG. 2A illustrates a front view of a buckle padding according to one embodiment of the present invention.
Figure 2B:
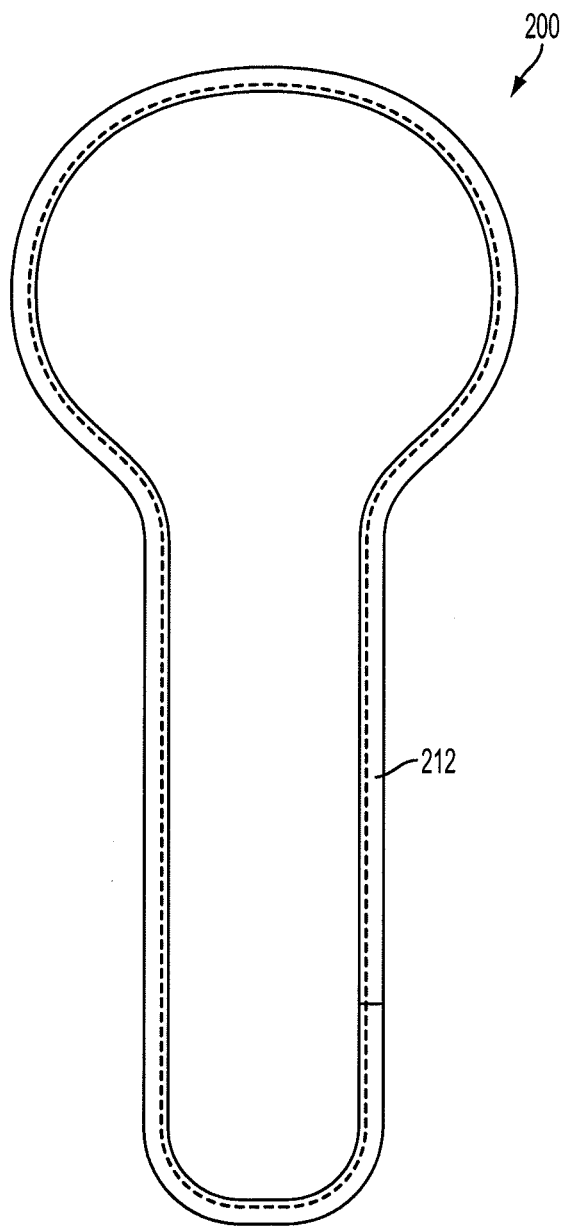
FIG. 2B illustrates a rear view of a buckle padding according to one embodiment of the present invention.
Figure 2C:
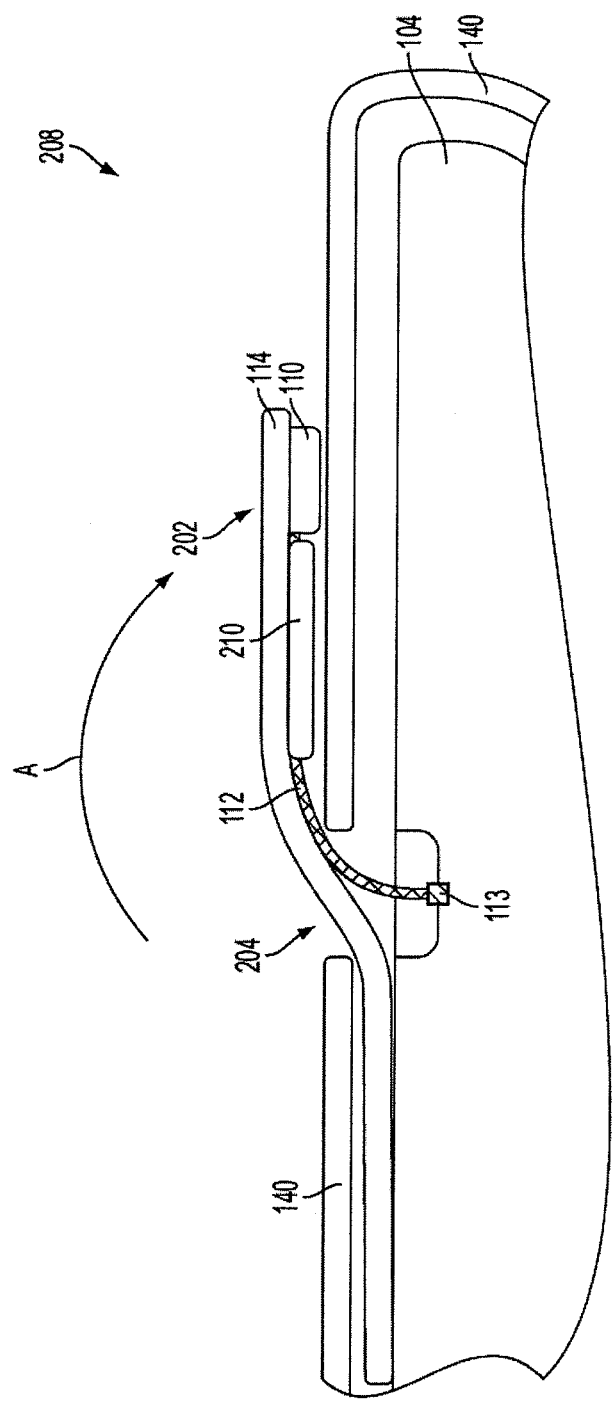
FIG. 2C illustrates a side view of a buckle assembly and seat portion according to one embodiment of the present invention.

FIGS. 2A and 2B illustrate a buckle pad 114 according to an example embodiment of the present invention. Specifically, FIG. 2A illustrates a front view of the buckle pad 114, while FIG. 2B illustrates a rear view of the buckle pad 114. In some embodiments, the buckle pad 114 may have a lollipop shape as shown in FIGS. 2A and 2B. For example, the buckle pad 114 may include a buckle pad head portion 202 and a buckle pad tail portion 204. Although shown in FIGS. 2A and 2B as having a lollipop shape, one skilled in the art may appreciate that the buckle pad 114 may have any shape and/or size. For example, the buckle pad head portion 202 may have a greater width than the buckle pad tail portion 204 (as shown) or the same width. Similarly, the buckle pad tail portion 204 may have a greater length than the buckle pad head portion 202 (as depicted) or the same length as the buckle pad head portion 202 in some embodiments. FIGS. 2A and 2B illustrate the buckle pad head portion 202 having a substantially circular shape. In other embodiments, however, the head portion 202 may be substantially shaped as a rectangle, oval, and/or any other shape.

According to some embodiments, the head portion 202 and the tail portion 204 may be shaped such that a longitudinal length of the tail portion 204 and/or head portion 202 is generally aligned with the buckle 110 and/or buckle webbing 112. For example, the buckle pad 114 may include a head portion 202 generally aligned with the buckle 110, wherein the buckle pad 114 is disposed between a child occupying the child safety seat and the buckle 110. The buckle pad head portion 202 may be configured to provide a child occupying the child safety seat 100 with cushioning from the buckle 110. For example, the head portion 202 may be disposed between the buckle 110 and the child while the harness assembly is in the engaged state such that a cushioning material disposed within the head portion 202 cushions the child from the buckle 110. Similarly, the tail portion 204 may be generally aligned with the buckle webbing 112, such that the tail portion is disposed between the child occupying the child safety seat and the buckle webbing. The buckle tail portion 204 may be configured to provide the seated child with cushioning from the buckle webbing 112 while the harness assembly is in the engaged state.

According to some embodiments, the buckle pad 114 may include a tail portion 204 configured to receive at least a portion of a biasing member 300 therein. The buckle pad 114 may, for example, include a biasing member pocket 208 that is disposed within the interior of buckle pad 114. In some embodiments, the biasing member pocket 208, depicted via dashed lines in FIG. 2A, may be accessible from the front of the buckle pad 114 via a biasing member pocket opening 206. As shown in FIG. 2A, the biasing member pocket 208 may extend from the bottom of the buckle pad tail portion 204 to the buckle pad head portion 202. In some embodiments, the biasing member pocket 208 may extend to the top of the buckle pad head portion 202. In other embodiments, the biasing member pocket 208 may extend to approximately one-half of the length of the buckle pad head portion 202, whereas in still other embodiments, the biasing member pocket 208 may extend to less than one-half of the length of the buckle pad head portion 202 (as depicted) or may be housed entirely within the buckle pad tail portion 204.

According to some embodiments, the buckle pad 114 may further include a buckle strap 210. As shown in FIG. 2A, the buckle strap 210 may be coupled to the exterior surface of the buckle pad 114. In one embodiment, the buckle strap 210 may be coupled to the exterior surface of the buckle pad 114 such that the buckle strap 210 and the exterior surface of the buckle pad 114 form a passageway therebetween. In particular, the passageway between the buckle strap 210 and the buckle pad 114 may be configured to allow a buckle webbing 112, shown in FIG. 1, to travel therethrough. Accordingly, the buckle strap 210 may be configured to receive the buckle webbing 112 therethrough such that when a biasing force is applied to the buckle pad 114 by the biasing member 300, the biasing force may also be applied to the buckle webbing 112 and/or the buckle 110 (e.g., the buckle assembly 108 as a whole). According to some embodiments, the biasing member 300 may be configured to move the buckle assembly 108 to the first position (shown in FIG. 2C), wherein the first position is adjacent the seat portion 104 and away from the back portion 102. For example, the biasing member 300 may be configured to apply a biasing force so as to move the buckle assembly to a first position adjacent the seat portion 104 and away from the back portion 102 when the harness assembly 106 is in the disengaged state. In some embodiments, the first position may be located forward of a second position (shown in FIG. 1), wherein the second position is defined by the position of the buckle when the harness is in the engaged state (e.g., when the shoulder straps 120 are engaged with the buckle assembly 108). Additionally and/or alternatively, the second position may be defined as a position adjacent to the position of a child occupying the seat, such as when the harness assembly 106 is in the engaged state.

In some embodiments of the present invention, the buckle pad 114 may include an edging 212 that surrounds the perimeter of the buckle pad 114, as shown in FIG. 2B. The buckle strap 210 may be coupled to the buckle pad 114 by placing a portion of the buckle strap 210 underneath the edging 212 and by securing the edging 212 to the perimeter of the buckle pad 114 with a stitching, adhesive, and/or the like. In embodiments without an edging 212, the buckle strap 210 may be coupled to the buckle pad 114 by securing the buckle strap 210 directly to the material forming the buckle pad 114 with a stitching, adhesive, and/or the like. In still other embodiments, the buckle strap 210 may be integral to the buckle pad 114. For example, the buckle pad 114 may include a fabric covering that is slitted such that the slitted portion of the buckle pad covering forms the buckle strap 210.

As noted above, the buckle assembly 108 may comprise a biasing member 300, as shown in FIG. 3. According to some embodiments, the biasing member 300 may be formed by taking a fixed length of material, such as a metal, plastic, composite plastic, elastic, fibrous, or any other resilient material that has a tendency to return to its original shape or position, and coupling one end of the material to an opposite end of the material, thereby forming a closed loop. In some embodiments, the biasing member 300 may be configured to be inserted into the biasing member pocket 208 of the buckle pad 114 via the biasing member pocket opening 206 (FIG. 2A). The biasing member 300 may be configured to extend along an interior perimeter of the biasing member pocket 208 when inserted therein. For example, the perimeter of the biasing member pocket 208 may be substantially similar to the length of the closed loop of the biasing member 300, and the biasing member 300 may be made of a material that, when formed into the loop, is configured to exert an outward force (e.g., away from a center of the loop) such that the biasing member maintains its shape and/or has a tendency to assume the shape of the biasing member pocket 208 in which it is held.

According to some embodiments, the biasing member 300 may comprise a length of material 302 and a coupling element 304 configured to couple the ends of the material 302 to each other to form the loop, as illustrated in FIG. 3. In some embodiments, the coupling element 304 may be configured to couple opposing ends of the braided strands of material 302 to each other. Additionally and/or alternatively, according to some embodiments, the coupling element 304 may comprise stainless steel, aluminum, or any other material suited to form a coupling element to couple one end of the length of material 302 to the opposite end of the length of material 302, such as via a threaded connection, clips, and/or other mechanical connection.

Figure 4:
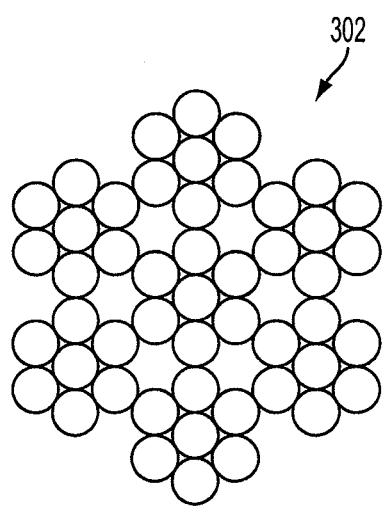
FIG. 4 illustrates a cross-sectional view of the biasing member of the buckle assembly according to one embodiment of the present invention.

According to some embodiments, the biasing member 300 may include a length of material 302 having a 7×7 stainless steel braided core construction, as shown in FIG. 4. In some embodiments, the braided strands of material 302 may comprise stainless steel having an SAE grade of 304. Further, the material 302 may comprise stainless steel and may have a length of approximately between 16 and 20 inches, such as approximately 18 inches. Additionally and/or alternatively, the braided material 302 may have a maximum diameter of approximately between 0.07 inches and 0.11 inches, such as approximately 0.09 inches. According to one embodiment, the coupling element 304 may be cylindrical in shape and may be configured to receive each of the opposing ends of the length of braided material 302 therein. The coupling element 304 may have a length of approximately between 0.6 inches and 1 inch, such as approximately 0.8 inches, and a maximum outer diameter of approximately between 0.15 inches and 0.19 inches, such as approximately 0.17 inches. Additionally and/or alternatively, the coupling element 304 may be configured to be deformed by an external force so as to create a butt end joint with the braided material 302.

The particular configuration of the biasing member 300 may vary, however, depending on the amount of biasing force needed to overcome the force of gravity to move the buckle assembly 108 toward a first position away from an occupant of the child safety seat 100 in the disengaged state. For example, the amount of biasing force may depend, at least in part, on the angle at which the seat portion 104 is joined to the back portion 102 of the child safety seat 100 and the resulting angle of the seat portion with respect to the horizontal plane. In an infant carrier, for example, the angle between the seat portion 104 and the horizontal plane may be around 45°, whereas in a seat for an older child (e.g., a convertible car seat), the angle between the seat portion 104 and the horizontal plane may be only about 10°-15°.

EXAMPLE

The following example has been included to provide guidance to one of ordinary skill in the art for practicing representative embodiments of the presently disclosed subject matter. In light of the present disclosure and the general level of skill in the art, those of skill can appreciated that the following example is intended to be exemplary only and that numerous changes, modifications, and alterations can be employed without departing from the scope of the presently disclosed subject matter.

Example 1

Characterization of Buckle Assembly

According to one embodiment of the present invention, the buckle assembly may include a buckle pad, a buckle, and a biasing member. In one embodiment, the buckle pad may include a wadding to provide a cushioned layer between a child occupant and the buckle. Additionally and/or alternatively, the wadding may be placed within the interior of a fabric defining the surface of the buckle pad. In some embodiments, the wadding may have an areal density of approximately 260 grams per square meter. The wadding may define a width of approximately 32 mm.

In some embodiments, the buckle pad may include a buckle pad tail portion and a buckle pad head portion. According to some embodiments, the buckle pad may be approximately 11.5 inches in length. The buckle pad head portion may be approximately 4.25 inches in length, and the buckle pad tail portion may be approximately 7.25 inches in length. Further, the buckle pad tail portion may be approximately 2.38 inches in width. According to some embodiments, the buckle pad head portion may be substantially circular in shape and may have a diameter of approximately 4.25 inches in length. In other embodiments, the buckle pad head portion may be elliptical in shape and have a minor axis of approximately 4.25 inches and a major axis of approximately 5 inches.

Additionally and/or alternatively, the buckle pad may include a biasing member pocket that extends from a distal end of the buckle pad tail portion into the buckle pad head portion. According to some embodiments, the biasing member pocket may be configured to receive a biasing member therein, wherein the biasing member comprises a closed loop of material, such as a braided steel rope. In some embodiments, the biasing member pocket may have a width of approximately 2 inches and a length of approximately 8.56 inches.

According to some embodiments, the buckle pad 114 and the biasing member 300 may be configured to be placed between a seat portion 104 of the child safety seat 100 and a seat cover 140. Additionally and/or alternatively, a buckle anchor may be configured to be coupled to the child safety seat 100. For example, a buckle anchor 113 (shown in FIG. 2C) may be attached to an end of the buckle webbing 112 opposite from the end of the buckle webbing 112 attached to the buckle 110, such that the buckle anchor may be coupled to the seat portion of the child safety seat so as to attach the buckle assembly 108 to the child safety seat 100. As such, the buckle webbing 112 may be configured to secure the buckle assembly 108 to the child safety seat 100. In some embodiments, when viewed from the front of the child safety seat 100, the buckle pad 114 may be disposed behind the buckle webbing 112, buckle 110, and/or buckle anchor 113 (shown in FIG. 2C), so as to be located between an occupant of the seat and the buckle and buckle webbing. In some embodiments, the buckle pad 114 may have a greater length than the combination of the buckle 110 and buckle webbing 112, such that when the buckle anchor 113 is coupled to the child safety seat 100, a portion of the buckle pad tail portion 204 may extend from the position where the buckle anchor is coupled to the seat portion 104 of the child safety seat 200 towards the back portion 102 of the child safety seat 200. Additionally and/or alternatively, a portion of the buckle pad 114 (e.g., an end of the tail portion 204) may be disposed between the seat portion 104 of the child safety seat 100 and the child safety seat cover 140 (e.g., under the seat cover), as illustrated in FIG. 2C. As such, the biasing member 300 may be configured to provide a biasing force to the buckle assembly 108 to position the buckle assembly forwardly toward a first position located away from the back portion 102 and towards the seat portion 104 when the harness assembly 106 is in a disengaged state, as shown in FIG. 2C. In some embodiments, the biasing member 300 may be configured to provide a biasing force to the buckle assembly 108 such that the buckle assembly 108 is biased toward the first position located away from an occupant when the harness assembly 106 is in a disengaged state.

Many modifications and other embodiments of the inventions set forth herein will come to mind to one skilled in the art to which these inventions pertain having the benefit of the teachings presented in the foregoing descriptions and the associated drawings. For example, although the embodiments depicted in the figures and described above include a buckle pad that is separate and distinct from the child safety seat cover, in some cases, the buckle pad may be connected to or at least partially integrated with the seat cover, such that the buckle pad is not removable from the seat cover. Moreover, in such embodiments, only the biasing member and the buckle webbing may extend under the seat cover, with the buckle pad disposed entirely above the seat cover. Therefore, it is to be understood that the inventions are not to be limited to the specific embodiments disclosed. Although specific terms are employed herein, they are used in a generic and descriptive sense only and not for purposes of limitation.

That which is claimed:

1. A harness assembly configurable between an engaged state and a disengaged state for a child safety seat comprising:
    a plurality of shoulder straps, each shoulder strap including a buckle tab; and at least one buckle assembly comprising:
        a buckle configured to receive the buckle tabs for securing the shoulder straps in the engaged state;
        a buckle pad, at least a portion of the buckle pad being generally aligned with and adjacent to the buckle;
        a buckle webbing extending from the buckle and configured to attach the buckle to the child safety seat; and
        a biasing member engaged with the buckle pad and configured to bias the buckle assembly toward a first position away from an occupant of the child safety seat in the disengaged state;
        wherein the buckle pad includes a buckle pad tail portion configured to receive at least a portion of the biasing member and a buckle pad head portion generally aligned with the buckle, wherein the buckle pad is disposed between the occupant and the buckle and is configured to provide the occupant with cushioning from the buckle, and
        wherein the biasing member comprises a closed loop of material.

2. The harness assembly of claim 1, wherein the closed loop of material comprises a metal material.

3. The harness assembly of claim 1, wherein the closed loop of material comprises a braided material.

4. The harness assembly of claim 1, wherein the buckle pad further comprises a biasing member pocket configured to receive the biasing member therein, wherein the biasing member pocket extends from one end located in the buckle pad tail portion to another end located in the buckle pad head portion.

5. The harness assembly of claim 1, wherein the buckle pad includes a buckle strap configured to receive the buckle webbing therethrough such that when a biasing force is applied to the buckle pad by the biasing member, the biasing force is also applied to the buckle webbing.

6. The harness assembly of claim 1, wherein the buckle webbing is configured to secure the buckle assembly to the child safety seat.

7. The harness assembly of claim 1, wherein the child safety seat comprises a back portion and a seat portion, and wherein the biasing member is configured to move the buckle assembly to a position adjacent the seat portion and away from the back portion in the first position.

8. The harness assembly of claim 1, wherein the first position is located forward of a second position, wherein the second position is defined by the position of the buckle when the harness assembly is in the engaged state.

9. The harness assembly of claim 1, wherein the biasing member comprises a flexible material configured to be fixedly engaged by the child safety seat at a first end, and wherein the biasing member is configured to be disposed proximate the buckle at a second end.

10. A child safety seat configurable to be attached to a vehicle seat, the child safety seat comprising:
    a seat portion configured to receive a child thereon;
    a back portion extending upwardly from an edge of the seat portion;
    a seat cover configured to cover the seat portion and the back portion; and a harness assembly configurable between an engaged state and a disengaged state, the harness assembly comprising:
a plurality of shoulder straps, each shoulder strap including a buckle tab; and
at least one buckle assembly comprising:
a buckle configured to receive the buckle tabs for securing the shoulder straps in the engaged state;
a buckle pad, at least a portion of the buckle pad being generally aligned with and adjacent to the buckle;
a buckle webbing extending from the buckle and configured to attach the buckle to the child safety seat; and
a biasing member engaged with the buckle pad and configured to bias the buckle assembly toward a first position away from the back portion of the child safety seat in the disengaged state;
wherein the buckle pad includes a buckle pad tail portion configured to receive at least a portion of the biasing member, wherein at least a portion of the buckle pad tail portion is disposed between the seat portion and the seat cover, and a buckle pad head portion generally aligned with the buckle, wherein at least a portion of the buckle pad is disposed between the occupant and the buckle and is configured to provide the occupant with cushioning for the buckle in the engaged state, and
wherein the biasing member comprises a closed loop of material.

11. The child safety seat of claim 10, wherein the closed loop of material comprises a braided metal material.

12. The child safety seat of claim 10, wherein the buckle pad further comprises a biasing member pocket configured to receive the biasing member therein, wherein the biasing member pocket extends from one end located in the buckle pad tail portion to another end located in the buckle pad head portion.

13. The child safety seat of claim 10, wherein the buckle pad includes a buckle strap configured to receive the buckle webbing therethrough such that when a biasing force is applied to the buckle pad by the biasing member, the biasing force is also applied to the buckle webbing.

14. The child safety seat of claim 10, further comprising a buckle anchor, the buckle anchor being coupled to an end of the buckle webbing opposite of the buckle and configured to attach the buckle assembly to the seat portion.

15. The child safety seat of claim 10, wherein the biasing member is configured to move the buckle assembly to a position adjacent the seat portion and away from the back portion in the first position.

16. The child safety seat of claim 10, wherein the first position is located forward of a second position, wherein the second position is defined by the position of the buckle when the harness assembly is in the engaged state.

17. The child safety seat of claim 10, wherein the biasing member comprises a flexible material configured to be fixedly engaged by the child safety seat at a first end, and wherein the biasing member is configured to be disposed proximate the buckle at a second end.

* * * * *